United States Patent
Nakazato

(10) Patent No.: US 7,753,634 B2
(45) Date of Patent: Jul. 13, 2010

(54) PARTS ATTACHING STRUCTURE

(75) Inventor: Hiroshi Nakazato, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 519 days.

(21) Appl. No.: 11/790,006

(22) Filed: Apr. 23, 2007

(65) Prior Publication Data
US 2007/0258795 A1  Nov. 8, 2007

(30) Foreign Application Priority Data
Apr. 24, 2006  (JP) .......................... P2006-119317

(51) Int. Cl.
*F16B 21/02* (2006.01)
(52) U.S. Cl. .................. 411/553; 411/349; 24/663
(58) Field of Classification Search ............... 411/349, 411/549, 550, 552, 553; 24/663
See application file for complete search history.

(56) References Cited

U.S. PATENT DOCUMENTS

| | | | | |
|---|---|---|---|---|
| 1,809,117 A * | 6/1931 | Golden | ......................... | 16/220 |
| 1,930,645 A * | 10/1933 | Ellis | ........................... | 248/239 |
| 3,460,210 A * | 8/1969 | Ellis | ........................... | 411/552 |
| 3,764,729 A * | 10/1973 | Kowalewski | ............ | 174/138 D |
| 3,800,369 A * | 4/1974 | Nikolits et al. | ............. | 24/590.1 |
| 3,986,780 A * | 10/1976 | Nivet | .......................... | 403/353 |
| 4,467,987 A * | 8/1984 | Small | ......................... | 248/68.1 |
| 4,770,586 A * | 9/1988 | Osterland | .................... | 411/349 |
| 4,906,152 A * | 3/1990 | Kurihara | ...................... | 411/182 |
| 5,142,834 A * | 9/1992 | Laclave et al. | ................ | 52/208 |
| 6,612,795 B2 * | 9/2003 | Kirchen | ...................... | 411/508 |
| 7,351,021 B2 * | 4/2008 | Gombert | ...................... | 411/439 |
| 7,491,025 B2 * | 2/2009 | Tangeman et al. | .......... | 411/553 |

FOREIGN PATENT DOCUMENTS

JP  3429202  5/2003

\* cited by examiner

*Primary Examiner*—Flemming Saether
(74) *Attorney, Agent, or Firm*—McGinn IP Law Group, PLLC

(57) ABSTRACT

This attaching structure includes: a first part having a slot; a second part having an attaching hole; and a clip for connecting those parts, the clip including a first flange portion, a shank portion, a second flange portion for coming into elastic abutment against the back side of the slot, a third flange portion, and a leg portion to be retained in the attaching hole, wherein: the shank portion has sliding portions of a large arcuate shape, and stopper portions of a small arcuate shape; protrusions are disposed on the first part in the periphery of the side portions close to the stopper portions when the first flange portion intersects at a right angle with respect to the slot; and the protrusions engage with the first flange portion to stop the turning motion thereby to prevent the clip from coming out from the first part.

6 Claims, 14 Drawing Sheets

PARTS ATTACHING STRUCTURE

BACKGROUND OF THE INVENTION

1. Field of the Invention

The present invention relates to a parts attaching structure, which is applied for attaching a first part such as a cover member for an automobile to a second part such as a panel member of the automobile.

2. Description of the Related Art

As the parts attaching structure of this kind of the prior art, there is disclosed in Japanese Patent No. 3,429,202 a parts attaching structure, in which a clip is attached to a first part (or a first panel-shaped part) having a slot so that the first part is attached to a second part (or a second panel-shaped part) through the clip by bringing the clip into engagement of an attaching hole of the second part. The clip is provided with a first flange portion of a rectangular shape having a longer diameter and a shorter diameter, a disc-shaped second flange portion extending downward from the first flange portion through a shank portion (or a neck portion) extending from the center of the lower face of the first flange portion, and a leg portion (or a foot portion) extending from the lower face of the second flange portion and engaging with the peripheral edge of the attaching hole of the second part. On the upper face of the second flange portion, moreover, there are formed a pair of protrusions, which are opposed at a right angle with respect to the center of the longer diameter direction of the first flange portion. The protrusions are forced, when the first flange portion is substantially parallel to the slot, to contact with the back side of the first part, but are fitted in the inner peripheries of the two end portions of the slot in the longitudinal direction.

When the first flange portion of the clip is inserted in alignment into the slot and turned to make a right angle with respect to the slot, the two end portions of the first flange portion engage with the peripheral edge of the slot, and the second flange portion abuts against the back side of the first part, and the paired protrusions on the upper face of the second flange portion are individually fitted in the two longitudinal end portions of the slot. As a result, the clip can be attached to the first part without turning backward or moving in the slot.

SUMMARY OF THE INVENTION

In the case of Japanese Patent No. 3,429,202, the first part of a predetermined thickness is sandwiched between the first and second flange portions. This constitution makes it impossible to attach the clip, if the thickness of the first part is larger than the gap between the first and second flange portions, for example. If the thickness of the first part is smaller than the gap between the first and second flange portions, the clip rattles to raise a disadvantage that a new clip has to be molded each time the thickness of the first part varies.

If the protrusions on the upper face of the second flange portion are made high, on the other hand, they abut more firmly against the inner periphery of the slot thereby to stop the turning motion or the like of the clip effectively. When the clip is turned at the attaching time, however, the protrusions are forced to contact with the back face of the first part thereby to make the clip reluctant to turn. If the protrusions are made low, on the other hand, the clip can be easily turned. However, the protrusions do not come, when fitted on the two longitudinal end portions of the slot, into effective engagement with the inner periphery of the slot so that the turning motion is not reliably stopped. This raises a problem that it is difficult to set the height of the protrusions.

As described above, moreover, the stop of the turning motion of the first part by the clip is insufficient, or the rattling occurs. As a result, the clip may come out from the first part, if the transportation is performed with the clip being not firmly attached to the first part.

Therefore, an object of the invention is to provide a parts attaching structure, which can attach a clip firmly to apart without being influenced by the thickness of the part and which can prevent the clip reliably from coming out from the part without deteriorating the attachment of the clip.

In order to achieve the aforementioned object, according to a first aspect of the invention, there is provided a parts attaching structure including: a first part having a slot; a second part having an attaching hole; and a clip for connecting those parts, the clip including: a first flange portion having a longer diameter shorter than the length of the slot of the first part and longer than the width of the slot and a shorter diameter shorter than the width of the slot and adapted to engage with the first part when inserted into and turned in the slot; a shank portion extending from the central portion of the abutment face of the first flange portion against the first part and inserted into the slot; a second flange portion bulging from the shank portion, extended obliquely toward the first flange portion and coming into elastic abutment against the peripheral edge of the back side of the slot; a third flange portion adjacent to the second flange portion, bulging from the shank portion and abutting against the peripheral edge of the attaching hole of the second part; and a leg portion extending from the central portion of the abutment face of the third flange portion against the second part, inserted into the attaching hole of the second part and retained on the peripheral edge of the back side of the attaching hole, wherein: the shank portion is formed to have a section of a generally rectangular shape, as viewed in the axial direction, in which a pair of diagonally positioned corners form sliding portions of arcs of a large curvature whereas the remaining paired corners form stopper portions of arcs or corners of a smaller curvature, in which the sliding portions is rotatable in a direction to contact with the longer sides of the slot, but in which the stopper portion is unrotatable in a direction to contact with the longer sides of the slot; the first flange portion is arranged to have its longer diameter direction in the direction of the paired opposed sides of the shank portion; and protrusions, with which the first flange portion engages in a manner to ride over, are formed on the first part in the states where the stopper portions engage with the longer sides of the slot so that the stopper portion is unrotatable any more and where the first flange portion has its longer diameter direction arranged to intersect the longer sides of the slot.

According to an aspect of the aforementioned invention, the clip is inserted such that the longer diameter of the first flange portion is in the longer side direction of the slot of the first part, and the first flange portion is pushed out through the slot. Then, the clip is turned by a predetermined angle, while the shank portion being inserted into the slot, in the direction where the sliding portions of the shank portion contact with the longer sides of the slot. The stopper portions come into engagement with the longer sides of the slot so that the clip cannot be turned any more. When the clip is turned, the first flange portion rides over the protrusions formed on the first part. When the stopper portions engage with the longer sides of the slot thereby to allow no more turning motion, the first flange portion is arranged to intersect its longer diameter direction with the longer sides of the slot.

Then, the protrusions formed on the first part come into engagement with the first flange portion having turned over the protrusions, so that the clip is regulated from turning in the returning direction. As a result, the state, in which the longer diameter direction of the first flange portion is arranged at a right direction with respect to the longer sides of the slot, is kept. Therefore, the clip 30 can be reliably prevented from coming out of the first part, till it is transported while being attached to the part, stored and used, for example. Moreover, the engagement between the protrusions formed on the first part and the first flange portion prevents the clip is from moving along the slot, so that the clip can be prevented from deviating from its attaching position. Here, the engagement between the protrusions on the first part and the first flange portion may also be exemplified by bringing the protrusions into engagement with the side portions of the first flange portion or by bringing the protrusions into engagement with the recesses formed in the lower face of the first flange portion.

In the aforementioned state, moreover, the second flange portion comes into elastic abutment against the peripheral edge of the back side of the slot. As a result, the first flange portion can be extracted into engagement from the slot of the first part, even if the thickness of the first part is changed within the elastically deformable range of the second flange portion. Thus, it is possible to provide the clip, which can be commonly used by the first parts of plural kinds having different thicknesses. Moreover, the second flange portion comes into elastic abutment against the peripheral edge of the back side of the slot, so that the first flange portion comes into close contact with the first part. As a result, the engaging force between the first flange portion and the protrusions of the first part can be enhanced without increasing the height of the protrusions thereby to restrict the turning motion of the clip more effectively without deteriorating the attachment of the clip.

Thus, the first part and the second part can be connected by inserting and retaining the leg portion of the clip in the attaching hole of the second part while the clip being attached to the first part. Here, in case the first part is to be removed from the second member, the clip is so forcibly turned that the first flange portion of the clip may ride over the protrusions, thereby to align the longer diameter direction of the first flange portion with the longer side direction of the slot, so that the first flange portion can be extracted from the slot thereby to extract first part from the second part.

In the first aspect of the invention, according to a second aspect of the invention, there is provided a parts attaching structure, wherein the protrusions are so disposed on the periphery of the side portion, as close to the stopper portions of the first flange portion, on the first part that the first flange portion can ride thereover.

According to this aspect of the invention, the state, in which the side portions of the first flange portion engage with the protrusions on the first part, can be visually confirmed to attach the clip reliably to the first part. Moreover, the protrusions on the first member are made to engage with the side portions of the first flange portion of the clip. Recesses for engaging with the protrusions need not be additionally formed in the back face of the first flange portion, and the first flange portion does not need a thickness for forming the recesses, so that the thickness of the first flange portion itself can be minimized. As a result, the first flange portion does not bulge largely from the upper face of the first part so that it can be prevented from interfering with another member thereby to enhance the layout properties and improve the appearance.

In the first aspect of the invention, according to a third aspect of the invention, there is provided a parts attaching structure, wherein the second flange portion is shaped to bulge obliquely outward in a skirt shape from the outer circumference of the shank portion toward the first flange portion.

The second flange portion is shaped to bulge obliquely outward in a skirt shape toward the first flange portion. As a result, the second flange portion abuts elastically against the back side of the slot over a wide range along the circumferential direction so that the clip can be stably fixed on the first part.

In the first aspect of the invention, according to a fourth aspect of the invention, there is provided a parts attaching structure, wherein the second flange portion includes a pair of feather members bulging obliquely outward from the opposed portions of the outer circumference of the shank portion toward the first flange portion.

According to the invention, the second flange portion includes a pair of feather members bulging obliquely outward from the opposed portions of the outer circumference of the shank portion toward the first flange portion. In case the clip is molded by a die, therefore, a parting face or the like can be easily set to make the mold design relatively simple, so that the manufacturing cost can be suppressed to improve the productivity.

According to the parts attaching structure of the invention, the clip is inserted such that the longer diameter of the first flange portion is aligned with the slot, and the clip is turned by a predetermined angle, while the shank portion being inserted into the slot, in the direction where the sliding portions of the shank portion contact with the longer sides of the slot. The stopper portions come into engagement with the longer sides of the slot so that the clip cannot be turned any more. At the same time, the first flange portion is turned over the protrusions on the first part, and the protrusions come into engagement with the side portions of the first flange portion, so that the clip is regulated from turning in the returning direction. The state, in which the longer diameter direction of the first flange portion is arranged to intersect the longer sides of the slot, can be kept. Therefore, the clip can be reliably prevented from coming out of the first part, till it is transported while being attached to the first part, stored and used, for example.

In the aforementioned state, moreover, the second flange portion is in elastic abutment against the peripheral edge of the back side of the slot. No matter whether the first part is thick or thin, the first flange portion can be extracted into engagement from the slot of the first part. Thus, it is possible to provide the clip, which can be commonly used by the first part of plural kinds having different thicknesses.

Moreover, the second flange portion comes into elastic abutment against the peripheral edge of the back side of the slot, so that the first flange portion comes into close contact with the first part. As a result, the engaging force between the first flange portion and the protrusions of the first part can be enhanced without making the protrusions high, and the turning motion of the clip can be restricted more effectively without deteriorating the attachment of the clip.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

One mode of embodiment of a parts attaching structure of the invention is described in the following with reference to FIGS. 1 to 9C.

Figure 1:
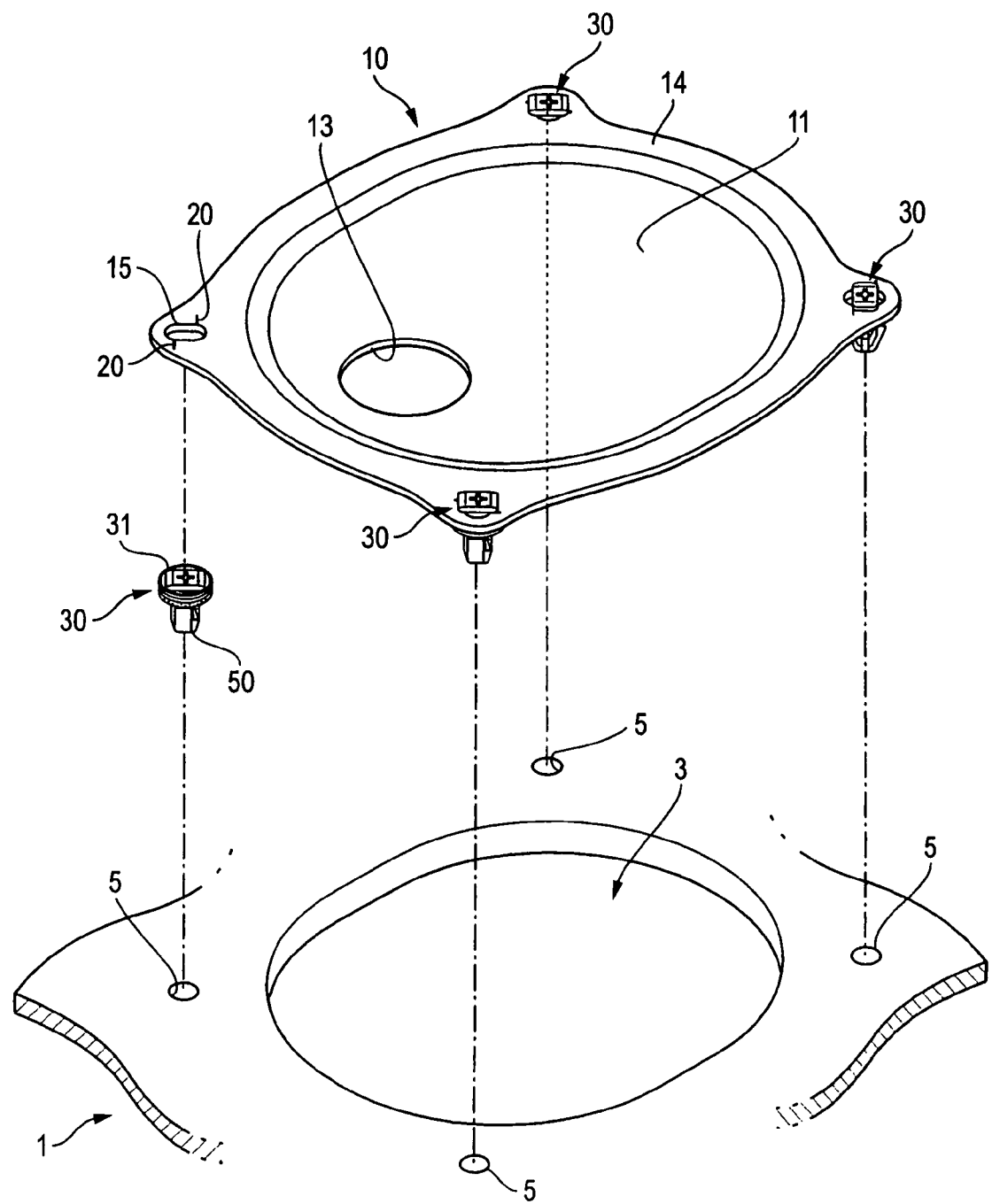
FIG. 1 is an exploded perspective view showing one mode of embodiment of a parts attaching structure of the invention.
Figure 2:
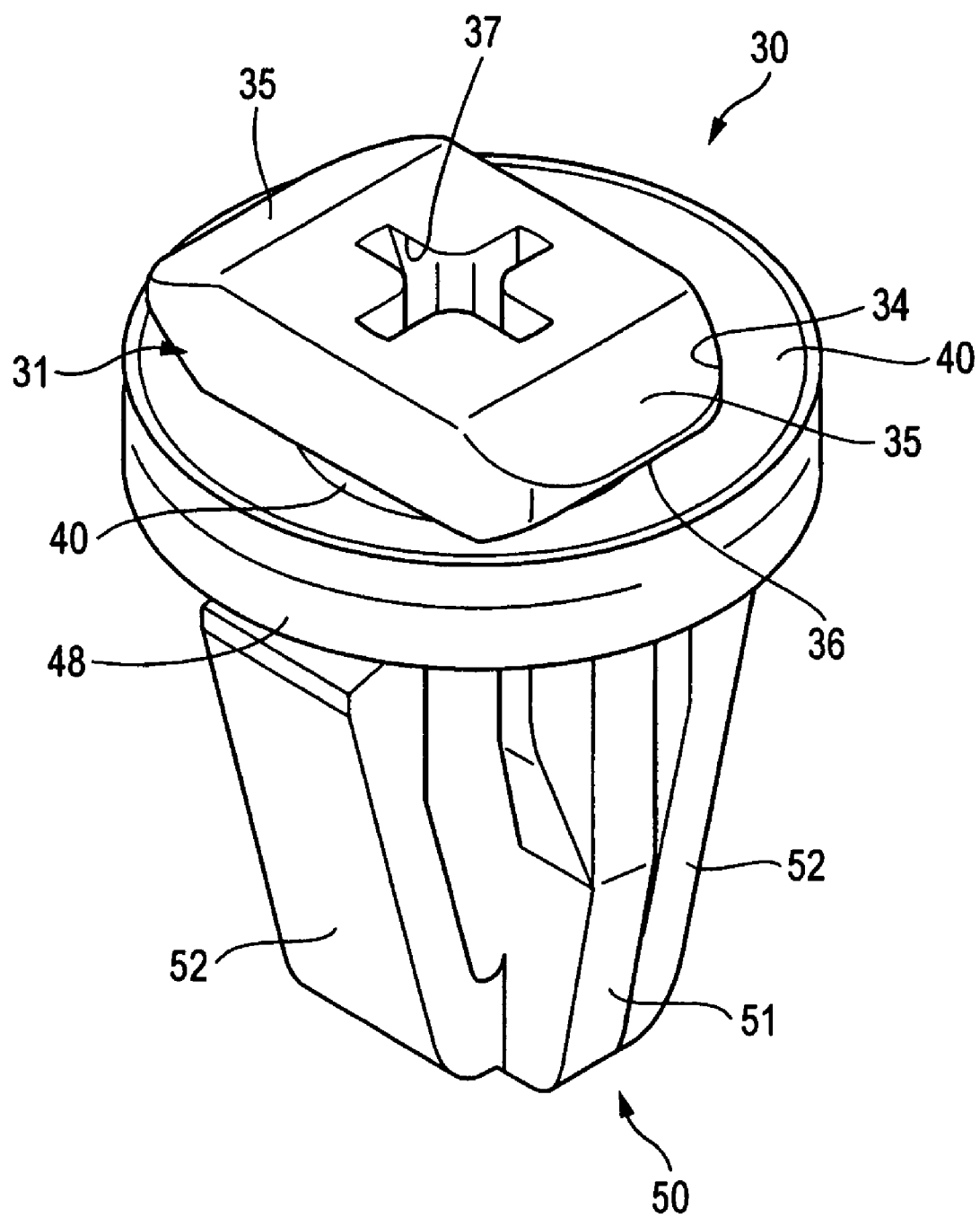
FIG. 2 is a perspective view of a clip constituting the parts attaching structure.

A fuel tank is arranged below the body panel of an automobile, for example. This fuel tank is connected with parts such as valves or pipes so that it is maintained by inspecting it periodically or by replacing the parts. As shown in FIG. 1, therefore, a panel member 1, as arranged above the fuel tank, has an opening portion 3 called the "maintenance hole". To this opening portion 3, there is attached a cover member 10 called the "maintenance hole cap". This mode of embodiment is applied to a structure, which connects the cover member 10 and the panel member 1 through clips 30. Specifically, the cover member 10 makes the first part in the invention, and the panel member 1 makes the second part in the invention. The cover member 10 is formed, at its four peripheral portions, with slots 15 for attaching the clips 30. In the panel member 1, moreover, there are formed attaching holes 5, which are so positioned in the outer periphery of the opening portion 3 as to match the slots 15 of the cover member 10.

Figure 4A:
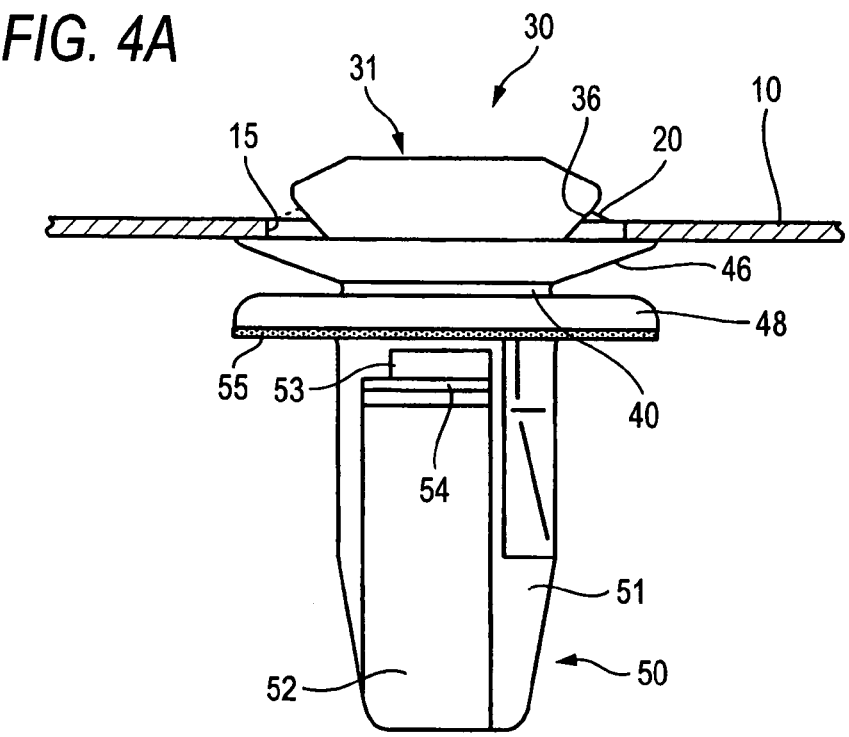
FIGS. 4A and 4B show a first step of attaching the clip to a first part, and present a front elevation at FIG. 4A and a top plan view at FIG. 4B.
Figure 4B:
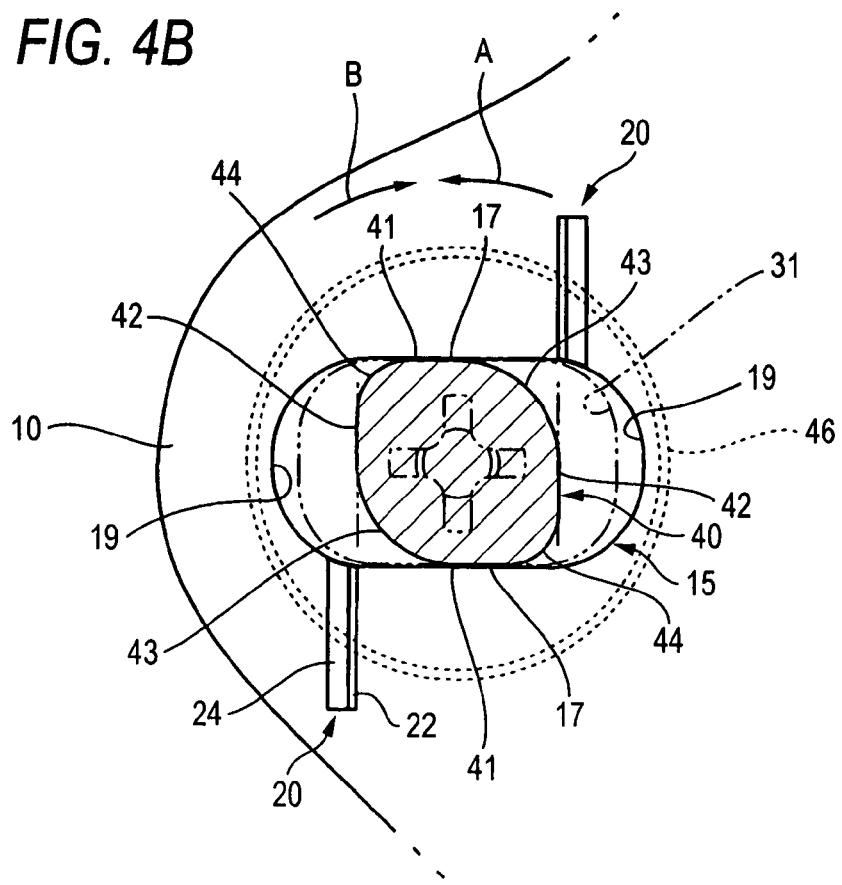

The cover member 10 is formed into such a predetermined shape by pressing a metallic sheet material that its central portion 11 is slightly recessed in an oval shape as can be fitted in the inner periphery of the opening portion 3 of the panel member 1. In a predetermined portion of the central portion 11, moreover, there is formed a gripping hole portion 13, through which the cover member 10 is easily removed from the panel member 1. Moreover, a flange portion 14 is formed to bulge outward from the peripheral edge of the central portion 11. The aforementioned slots 15 are individually formed in the four portions of the corner portions of that flange portion 14. Here, these slots 15 are so inclined at a predetermined angle that their longitudinal directions are directed toward the center of the cover member 10. As shown in FIG. 4B, for example, each slot 15 is provided with a pair of opposed longer sides 17, and shorter sides 19 connecting the two end portions of those longer sides in an arcuate shape.

Next, the clip 30 to be used in the invention is described. As shown in FIGS. 2 and 3A to 3D, the clip 30 is constituted to include: a first flange portion 31; a shank portion 40 extending from the center of the lower face of the first flange portion 31; a second flange portion 46 bulging from the outer circumference of that shank portion 40; a third flange portion 48 disposed below and adjacent to the second flange portion 46; and a leg portion 50 extending from the center of the lower face of the third flange portion 48.

Figure 3A:
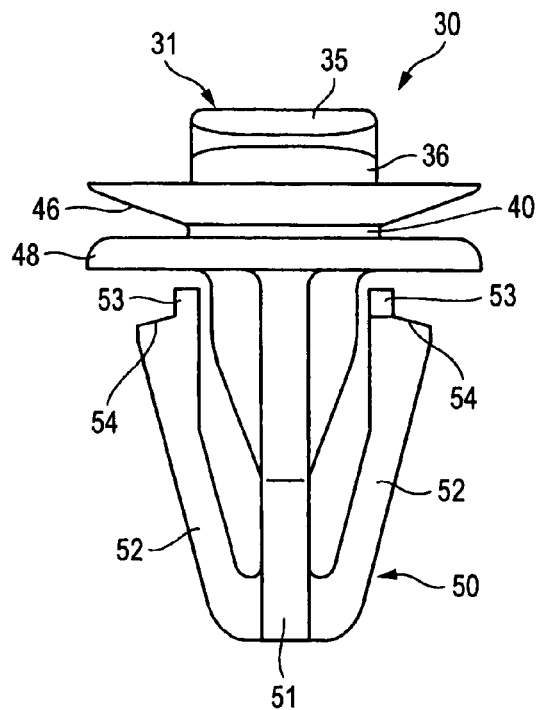
FIGS. 3A to 3D show the clip, and present a front elevation at FIG. 3A, a right side elevation at FIG. 3B, a top plan view at FIG. 3C and a bottom view at FIG. 3D.
Figure 3B:
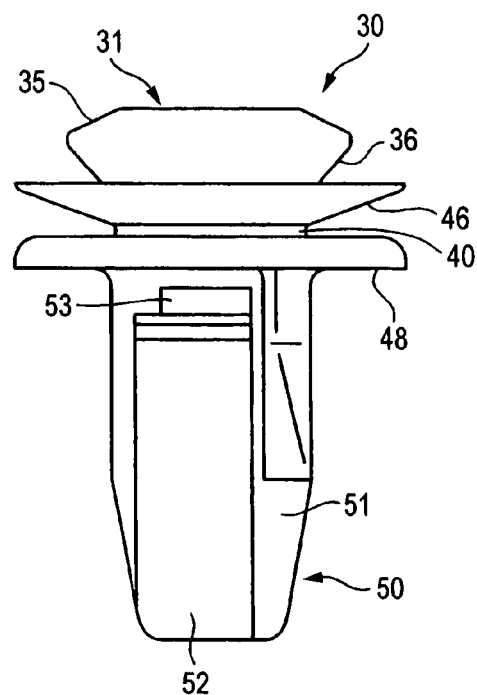
Figure 3C:
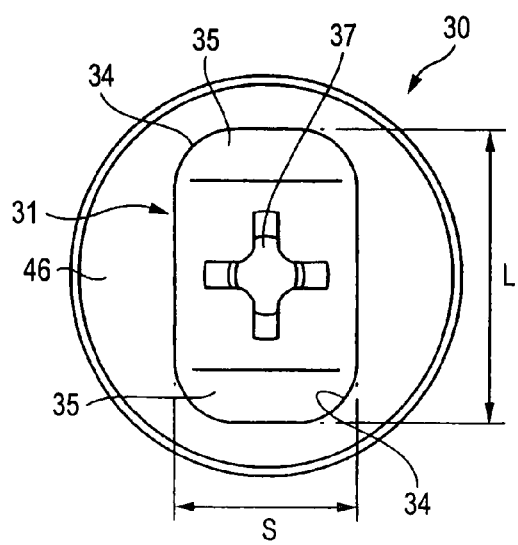

The first flange portion 31 is formed, as shown in FIG. 3C, into a rectangular shape having a longer diameter shorter than the longer side 17 of the slot 15 but longer than the shorter side 19 of the slot 15, and a shorter diameter S shorter than the length of the shorter side 19 of the slot 15, so that it can be inserted into the slot 15. When the first flange portion 31 is turned after inserted into the slot 15 from the back side of the cover member 10, moreover, its two end portions in the longer diameter direction come into engagement with the surface side peripheral edge of the slot 15. Moreover, each of the four corners 34 of the first flange portion 31 is formed in an arcuate shape so that the first flange portion 31 can be smoothly inserted into the slot 15 without being caught by the peripheral edge of the slot 15.

As shown in FIG. 3B, moreover, on the two upper and lower faces of the two end portions of the first flange portion 31 in the direction of the longer diameter, respectively, there are formed tapered faces 35 and 36, which are gradually thinned toward the end portions. Of these tapered faces 35 and 36, the lower tapered face 36 has actions to enable the first flange portion 31, when inserted into the slot 15 and turned, to smoothly ride on the edge of the slot 15 and to engage with the surface side peripheral edge of the slot 15, and to ride over the later-described protrusions 20 formed on the cover member 10. In the central portion of the upper face of the first flange portion 31, moreover, there is formed a tool insertion slot 37 having a cross shape, into which the tip of a tool such as a plus driver can be inserted. Here, the tool insertion slot 37 should not be limited to the cross shape, but may also be a slit having a merely straight light, when a minus driver or the like is used as the tool.

From the central portion of the lower face (or the face to abut against the cover member 10) of the first flange portion 31, there extends the shank portion 40, which is to be inserted into the slot 15. As shown in FIG. 4B, FIG. 5B and FIG. 6B, the section, as viewed in the axial direction, of the shank portion 40 is formed into a generally rectangular shape, which is composed of a pair of straight portions 41 and 41, and other straight portions 42 and 42 perpendicular to the former. A pair of diagonally positioned corners form sliding portions 43 of arcs having a large curvature, and the remaining pair of corners form stopper portions 44 of arcs having a smaller curvature than that of the sliding portions 43. Moreover, the shank portion 40 is arranged such that the paired straight portions 41 may be parallel to the longer diameter direction of the first flange portion 31. As shown in FIGS. 4A and 4B, therefore, at the first time when the first flange portion 31 is inserted into the slot 15, the shank portion 40 is so inserted into the slot 15 that the straight portions 41 and 41 of the shank portion 40 are arranged in parallel with the longer sides 17 of the slot 15. In this state, the shank portion 40 can be turned in the direction (or in the direction A of FIG. 4B) for the sliding portions 43 to contact with the longer sides 17, but can not be turned in the direction (or in the direction B of FIG. 4B) for the stopper portions 44 to contact with the longer sides 17 of the slot 15, because the stopper portions 44 engage with the longer sides 17 of the slot 15. Here in this embodiment, the stopper portions 44 are formed of the arcs of a smaller curvature than that of the sliding portions 43, but may also be corners of the substantially right angle if they can abut against the longer sides 17 to stop the turning motion.

From the outer circumference of the shank portion 40, there bulges a second flange portion 46, which is formed into a skirt shape obliquely outward toward the first flange portion 31. This first flange portion engages with the surface side of the cover member 10, and the second flange portion 46 engages with the back side of the cover member 10 thereby to clamp the peripheral edge of the slot 15 of the cover member 10 in between, so that the clip 30 is attached to the cover member 10. Moreover, the second flange portion 46 is formed to a size to cover the slot 15 entirely from the back side of the cover member 10. Furthermore, the gap between the lower end face of the first flange portion 31 and the upper end face of the second flange portion 46 is made at least narrower than the thickness of the cover member 10. Preferably, the upper end face of the second flange portion 46 is made to bulge to the same level as or to the higher level than the lower end face of the first flange portion 31. In the state, in which the first flange portion 31 engages with the peripheral edge of the surface side of the slot 15, the second flange portion 46 is elastically pressed to contact with the peripheral edge of the back side of the slot 15.

The shank portion 40 extends farther from the center of the lower face of the second flange portion 46, and the third flange portion 48 bulges from the outer circumference of the shank portion 40 extending from the center of the lower face of the second flange portion 46. This third flange portion 48 is formed into a disc shape having substantially the same external diameter as that of the second flange portion 46, and abuts against the peripheral edge of the attaching hole 5 of the panel member 1 or the second part of the invention.

Figure 3D:
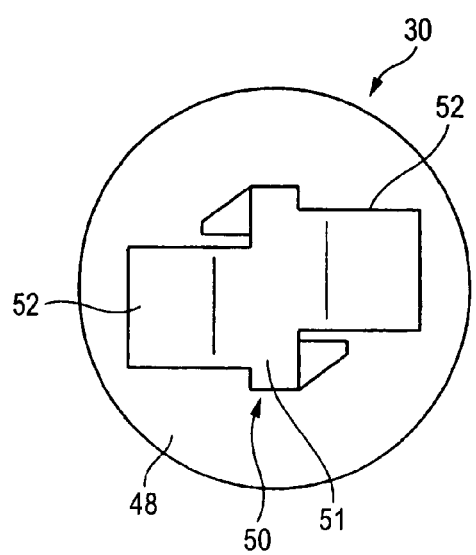
Figure 8:
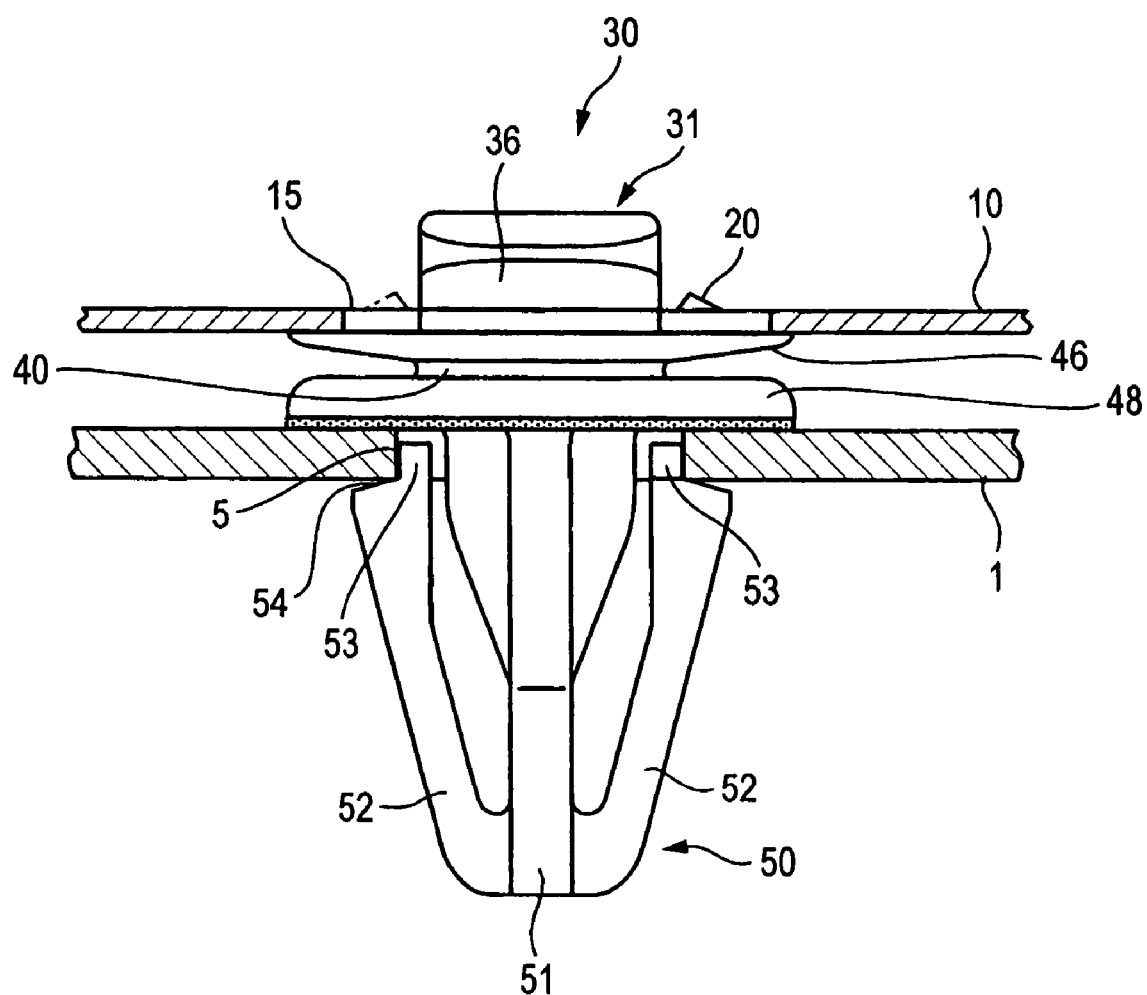
FIG. 8 is an explanatory view showing the state, in which the first part is attached to a second part through the clip.

The leg portion 50 extends from the lower face (or the face to abut against the panel member 1) of the third flange portion 48. This leg portion 50 is constituted (as referred to FIG. 3A) of a plate-shaped stem portion 51 extending substantially vertically from the center of the lower face of the third flange portion 48, and a pair of elastic members 52 and 52 extending in an anchor shape from the two sides of the leading end portion of the stem portion 51 toward the third flange portion 48. These elastic members 52 and 52 are formed, as shown in FIG. 3D, at positions offset transversely across the stem portion 51. At the leading end portions of the paired elastic members 52, moreover, there are formed engaging step portions 54, from the inner peripheral side of which engaging members 53 individually protrude. As shown in FIG. 8, the engaging step portions 54 engage with the peripheral edge of the back side of the attaching hole 5 formed in the panel member 1. Then, the engaging members 53 are inserted into the inner periphery of the attaching hole 5.

Figure 6A:
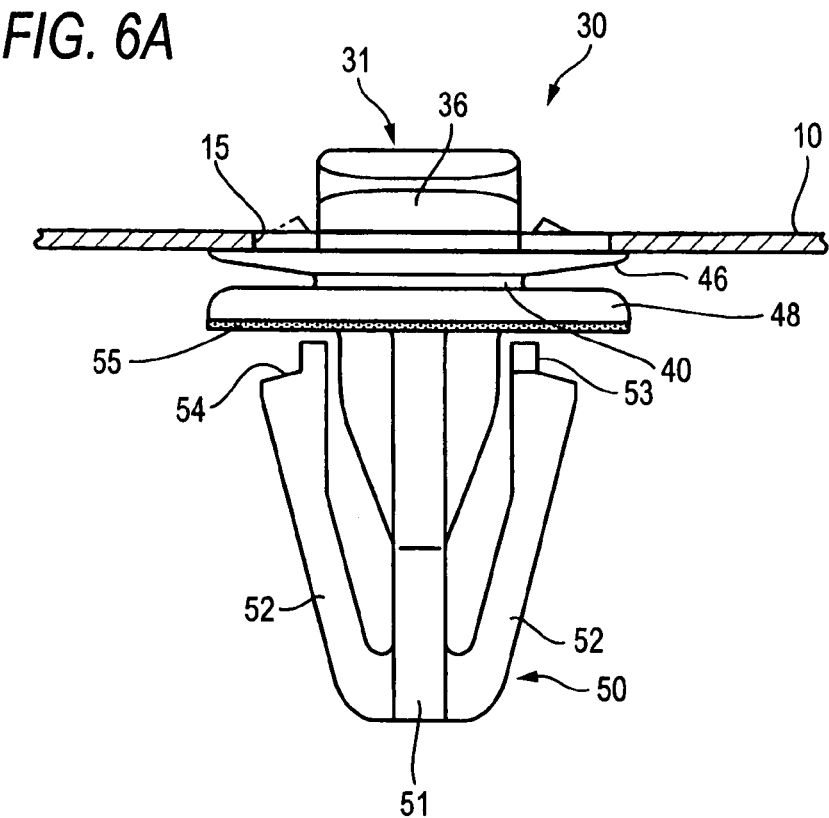
FIGS. 6A and 6B show a second step of attaching the clip to the first part, and present a front elevation at FIG. 6A and a top plan view at FIG. 6A.
Figure 6B:
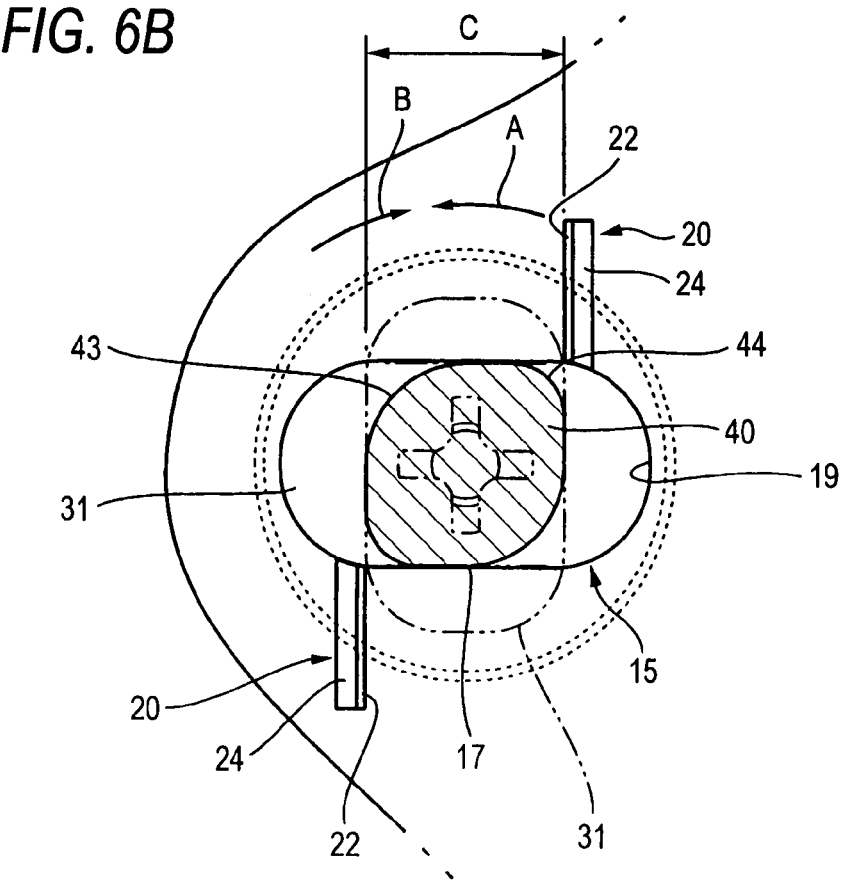
Figure 7:
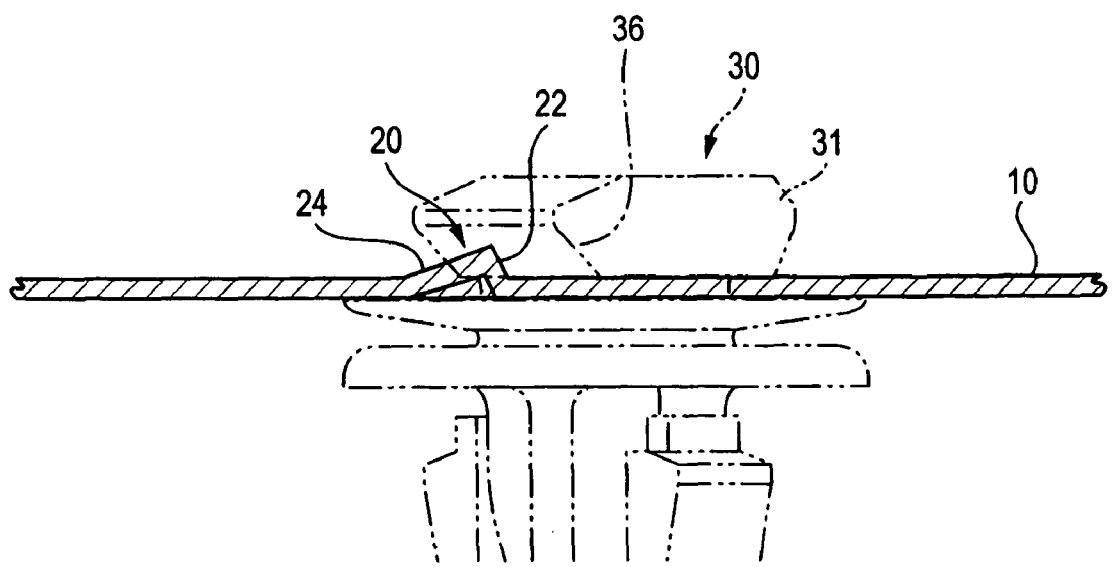
FIG. 7 is a sectional view of the first part, as taken along line VII-VII of FIG. 5B.

Next, with reference to FIGS. 4A to 6B, the shape of the periphery of the slot 15 of the cover member 10 is described in connection with the first flange portion 31 of the clip 30. The slot 15 is constituted of the paired longer sides 17 and 17 parallel to each other, and the arcuate shorter sides 19 and 19 connecting the two end portions of those longer sides 17 and 17 individually, and is entirely formed into an oval shape. At the peripheral edges of the paired confronting longer sides 17 of the slot 15 of the cover member 10, there are formed a pair of protrusions 20, which are so positioned in a rotational symmetry as to confront the center of the shank portion 40 obliquely. These protrusions 20 extend at a right angle by a predetermined length from the individual longer sides 17 of the slot 15. Moreover, the protrusions 20 have such an angular sectional shape, as shown in FIG. 7, as viewed in a direction normal to the longer side 17 of the slot 15. In this case, one slope, which is positioned on such a side that the first flange portion 31 abuts at first when the first flange portion 31 is turned in the direction of arrow A from the state of FIG. 4B, is a gently sloped guide face 24, and the other slope, which is positioned on such a side that the first flange portion 31 abuts at first when the first flange portion 31 is turned in the direction of arrow B from the state of FIG. 6B, is a steeply sloped engaging face 22. Moreover, the gap C between the individual protrusions 20, as shown in FIGS. 6A and 6B, has a length suited for the shorter diameter S of the first flange portion 31 of the clip 30. When the first flange portion 31 is turned in the direction of arrow A from the state of FIG. 4B, therefore, its two end portions ride over the individual protrusions 20 from the sides of the guide faces 24 to the sides of the engaging faces. When the state of FIG. 6B is reached, the two side portions of the first flange portion along the longer diameter direction are clamped between the paired protrusions 20 thereby to block the turns in the returning direction (or in the direction of arrow B of FIG. 6B).

Figure 9A:
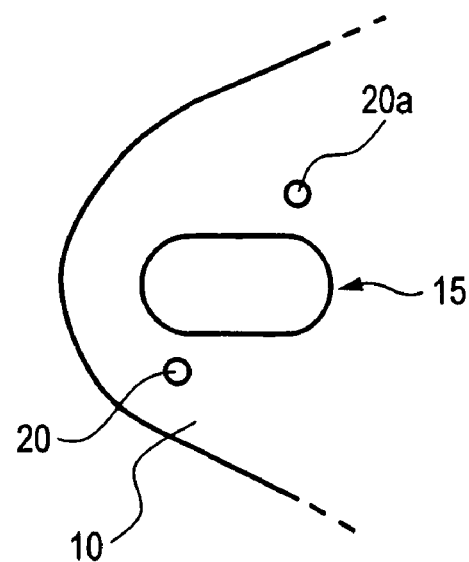
FIGS. 9A to 9C show another shape of protrusions formed at the first part, and present a top plan view at FIG. 9A and a side elevation at FIGS. 9B and 9C.
Figure 9B:
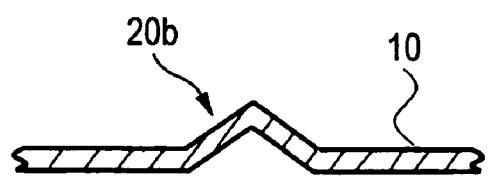
Figure 9C:
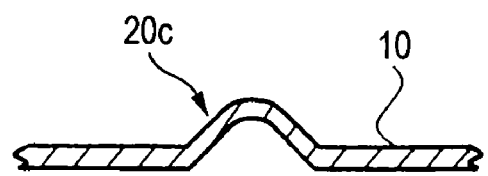

Here in this mode of embodiment, the protrusions 20 are formed into an angular bead shape composed of a pair of slopes having different angles. However, this shape should not be especially limited thereto but may be any if it permits the first flange portion 31 to engage in a riding-over manner. For example, the protrusion may be protrusion 20a protruding in a conical shape from the upper face of the cover member 10, as shown in FIG. 9A, a protrusion 20b of the angular bead shape of a pair of slopes having equal angles, as shown in FIG. 9B, or a rather rounded protrusion 20c formed to have an arcuate crest at an angular bead shape, as shown in FIG. 9C.

Next, the actions of the parts attaching structure thus constituted according to the invention are described.

At first, the first flange portion 31 is inserted, while its longer diameter direction being aligned with the direction along the longer sides 17 of the slot 15, from the back side of the cover member 10 into the slot 15, and is then pushed from the surface side of the slot 15. Then, the shank portion 40 is inserted into the slot 15, as shown in FIGS. 4A and 4B, so that the second flange portion 46 is brought into abutment against the back side of the cover member 10.

Figure 5A:
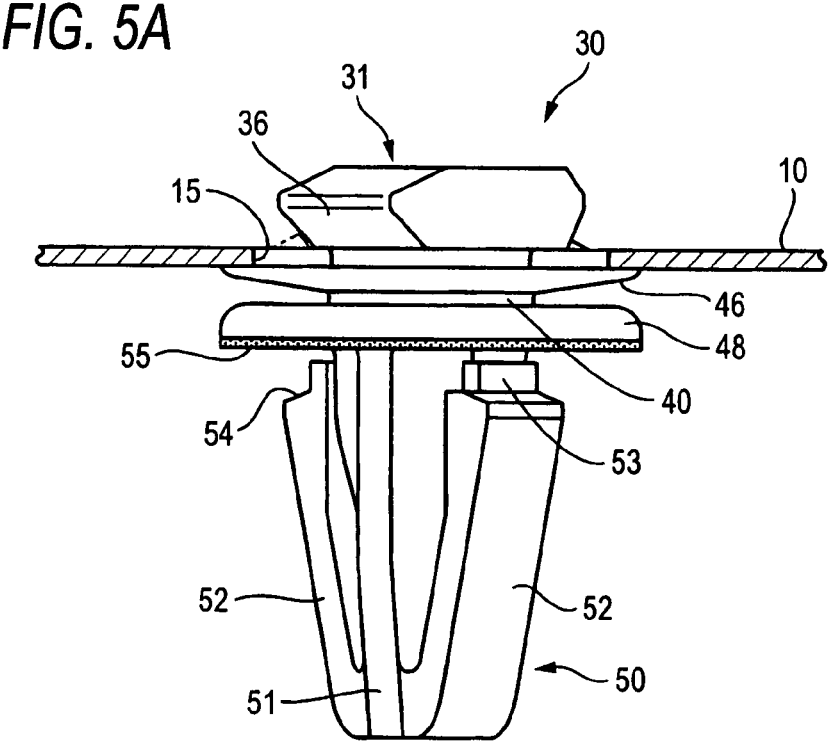
FIGS. 5A and 5B show a second step of attaching the clip to the first part, and present a front elevation at FIG. 5A and a top plan view at FIG. 5B.
Figure 5B:
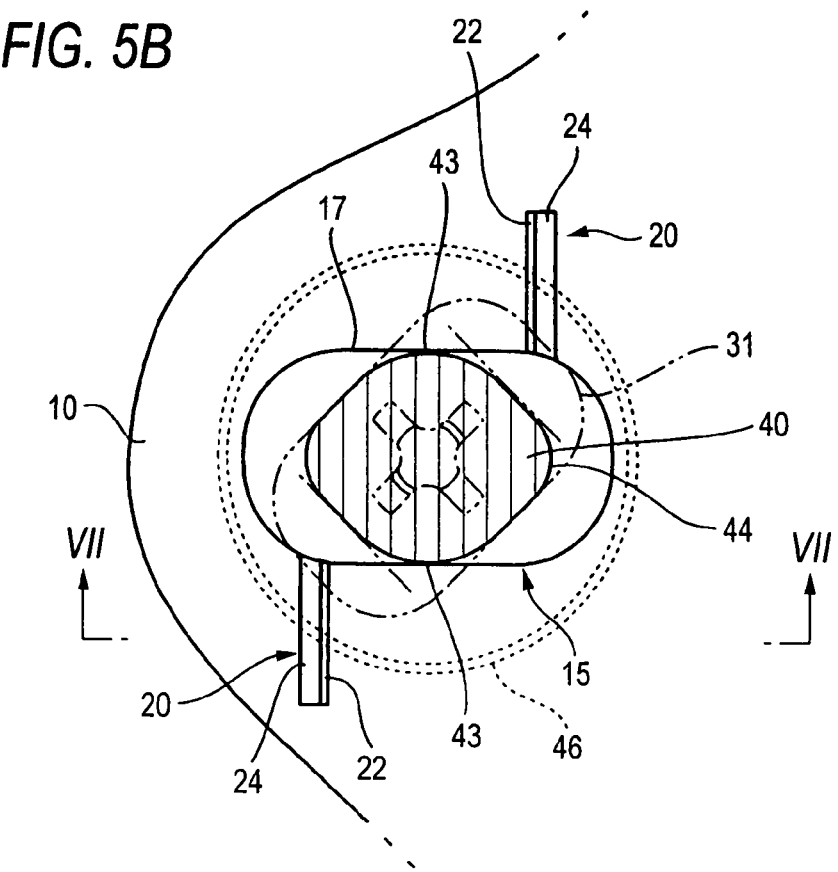

In this state, the clip 30 is turned in the direction (or in the direction of arrow A in the case of FIGS. 4A and 4B) to bring the sliding portions 43 into contact with the lower sides 17 of the slot 15, the shank portion 40 can be turned while the sliding portions 43 being in sliding contact with the longer sides 17, as shown in FIG. 5A and 5B. At this time, the tapered face 36 on the lower face side of the first flange portion 31 abuts against the edge of the slot 15 and rides on the surface side of the cover member 10. Moreover, the tapered face 36 contacts with the guide faces 24 of the protrusions 20, and rides over the protrusions 20 from the sides of the guide faces 24 to the sides of the engaging faces 22.

When the two end portions of the first flange portion 31 thus ride over the protrusions 20, the stopper portions 44 abut against the longer sides 17 of the slot 15 so that the clip 30 cannot be turned any more in the direction of arrow A. In this state, the first flange portion 31 intersects the longer sides 17 of the slot 15 at an angle near the right angle, preferably at an angle of 90 degrees ±30 degrees, and engages with the peripheral edge of the slot 15.

As a result, the first flange portion 31 engages with the surface side of the cover member 10, and the second flange portion 46 engages with the back side of the cover member 10, so that the two flange portions clamp the peripheral edge of the slot of the cover member 10 thereby to attach the clip 30 to the cover member 10.

In this state, moreover, the protrusions 20 are individually arranged at the two side portions along the longer diameter direction of the first flange portion 31, so that they clamp the two sides of the first flange portion 31. As a result, the first flange portion 31 is brought, when it is turned in the returning direction, i.e., in the direction of arrow B of FIG. 6B, into engagement at its two side portions with the engaging face 22 of the protrusions 20, so that its turning motion is blocked.

Thus, there is kept the state, in which the longer diameter direction of the first flange portion 31 is arranged at a right direction with respect to the longer sides 17 of the slot 15. Therefore, the clip 30 can be reliably prevented from coming out of the cover member 10, till it is transported while being attached to the cover member 10, stored and used, for example. Moreover, the protrusions 20 at the periphery of the slot 15 engage with the two side portions of the first flange portion 31. During the transportation, for example, the clip 30 is prevented from moving along the longer side direction of the slot 15. It is, therefore, possible to prevent the attached position of the clip 30 from deviating with respect to the cover member 10, and to suppress the rattling of the clip 30 in the slot 15.

In the state shown in FIGS. 4A and 4B, on the other hand, the second flange portion 46 abuts against the back side of the cover member 10. As the clip 30 is turned, the first flange portion 31 is slightly raised by the thickness of the cover member 10, and the second flange portion 46 is pushed and elastically deformed by the cover member 10, so that the second flange portion comes, in the state shown in FIGS. 6A and 6B, into elastic abutment against the peripheral edge of the back side of the slot 15. As a result, the first flange portion 31 can be extracted into engagement from the slot 15 of the cover member 10, even if the thickness of the cover member 10 is changed within the elastically deformable range of the second flange portion 46. Thus, it is possible to provide the clip 30 which can be commonly used by the cover members 10 of plural kinds having different thicknesses. Moreover, the second flange portion 46 comes into elastic abutment against the peripheral edge of the back side of the slot 15, so that the first flange portion 31 comes into close contact with the cover member 10. As a result, the engaging force between the first flange portion 31 and the protrusion 20 of the cover member 10 can be enhanced to restrict the turning motion of the clip 30 more effectively.

In the aforementioned state, in which the first flange portion 31 is arranged to have its longer diameter direction intersecting the longer sides 17 of the slot 15), moreover, the protrusions 20 are so formed on the cover member 10 in the periphery of the side portions close to the stopper portions 44 of the first flange portion 31 as can be ridden over by the first flange portion 31. Therefore, the state, in which the side portions of the first flange portion 31 engage with the protrusions 20 on the cover member 10, can be visually confirmed to attach the clip 30 reliably to the cover member 10. Moreover, the protrusions 20 on the cover member 10 are made to engage with the side portions of the first flange portion 31 of the clip 30. Recesses for engaging with the protrusions 20 need not be additionally formed in the back face of the first flange portion 31, and the first flange portion 31 does not need a thickness for forming the recesses, so that the thickness of the first flange portion 31 itself can be minimized. As a result, the first flange portion 31 does not bulge largely from the upper face of the cover member 10 so that it can be prevented from interfering with another member thereby to enhance the layout properties and improve the appearance.

In this mode of embodiment, moreover, the second flange portion 46 is shaped to bulge obliquely outside in a skirt shape from the outer circumference of the shank portion 40 toward the first flange portion 31. As a result, the second flange portion 46 abuts elastically against the back side of the slot 15 over a wide range in the circumferential direction so that the clip 30 can be stably fixed on the cover member 10.

The clips 30 are attached to the aforementioned manner in the four slots 15 of the cover member 10, and an annular packing 55 made of a foamed resin such as urethane foam are then mounted, if necessary, in the leg portions 50 of the individual clips 30. Then, the cover member 10 is pushed into the panel member 1 with the individual leg portions 50 being aligned with the four attaching holes 5 of the panel member 1. Then, the paired elastic members 52 and 52 are warped inside while being pushed by the inner circumferences of the attaching holes 5. When the engaging members 53 at the leading end arrive the inner circumferences of the attaching holes 5, the individual elastic members 52 elastically restore, so that the engaging step portions 54 come into engagement with the circumferential edges of the back sides of the attaching holes 5. The cover member 10 can be connected to the panel member 1, as shown in FIG. 8. As a result, the central portion 11 of the cover member 10 is fitted in the inner peripheral edge of the opening portion 3 of the panel member 1, so that the opening portion 3 is covered with the cover member 10.

In case, on the other hand, the cover member 10 is to be removed from the panel member 1 when the fuel tank is to be subjected to the maintenance, the tip of the tool such as the plus driver is inserted into the tool insert slot 37 in the upper face of the first flange portion 31 of the clip 30. The clip is so forcibly turned in the direction of arrow B, as shown in FIGS. 6A and 6B, that the first flange portion 31 may ride over the protrusions 20, thereby to align the longer diameter direction of the first flange portion 31 with the longer side direction of the slot 15. Then, the first flange portion 31 is disengaged from the slot 15 so that the first flange portion 31 can be extracted from the slot 15. After this, the gripping hole portion 13 of the cover member 10 is gripped and pulled upward so that the cover member 10 can be extracted from the panel member 1.

Figure 10:
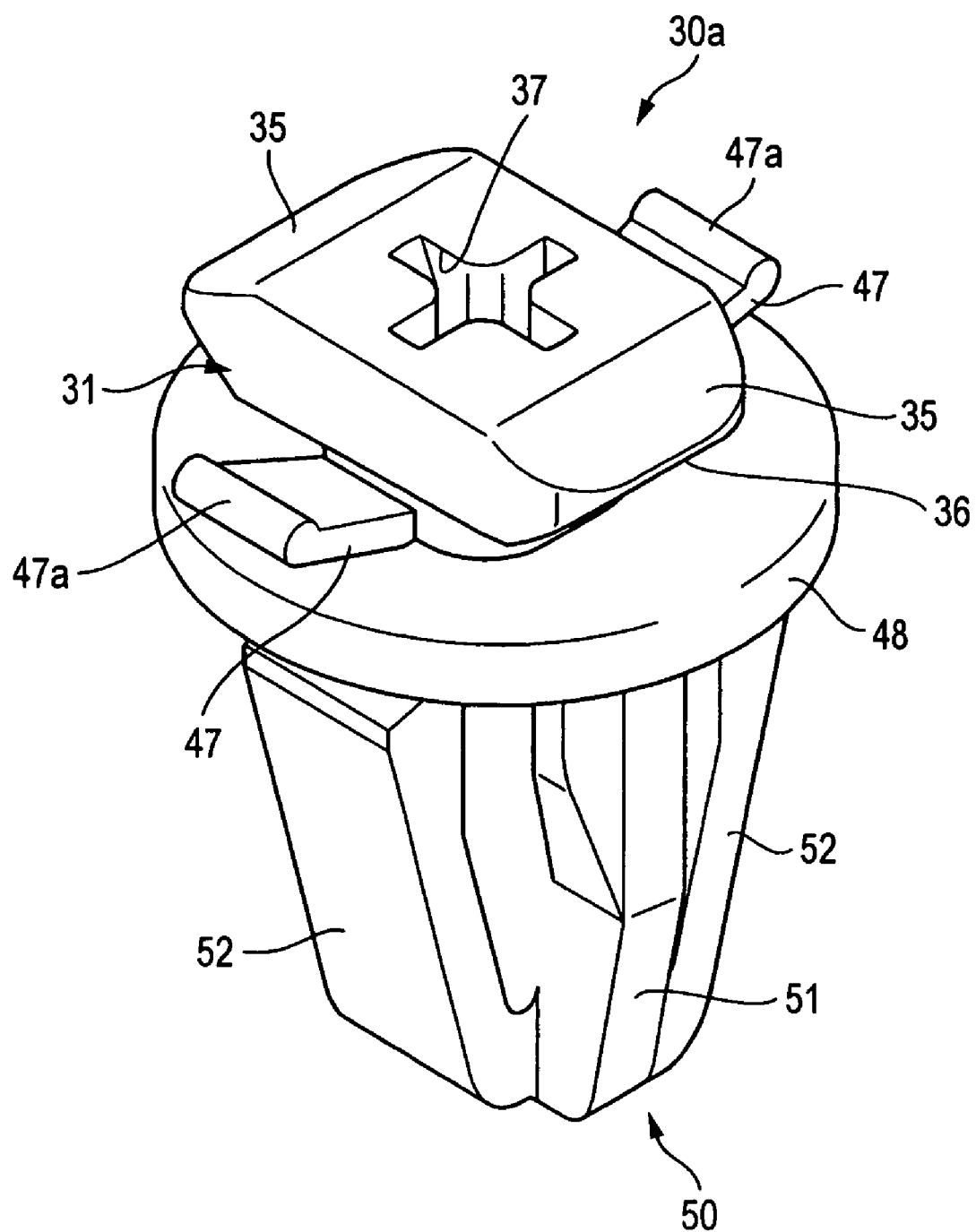
FIG. 10 is a perspective view showing a clip constituting another mode of embodiment of the parts attaching structure of the invention.

FIGS. 10 to 1B show another mode of embodiment of the parts attaching structure according to the invention. Here, the portions substantially identical to those of the foregoing mode of embodiment are omitted in their description by designating them by the common reference numerals.

The attaching structure of this mode of embodiment is different from that of the foregoing mode of embodiment in the shape of the clip to be attached to the cover member 10. More specifically, a clip 30a of this mode of embodiment is different in the shape of a second flange portion 47 from the clip 30 of the foregoing mode of embodiment.

With reference to FIGS. 10 and 11A to 11D, the second flange portion 47 of this clip 30a is made of a pair of feather members, which extend obliquely outward toward the first flange portion 31 from the opposed portions of the outer circumference of the shank portion 40.

Figure 11A:
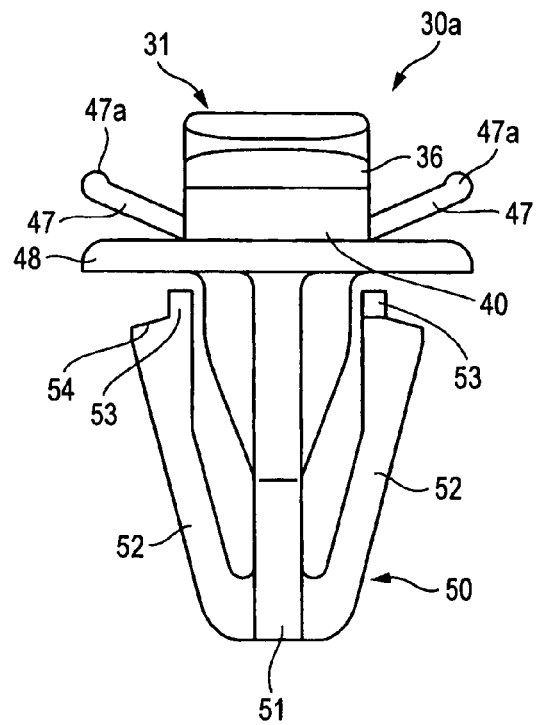
FIGS. 11A to 11D show the clip, and present a front elevation at FIG. 11A, a right side elevation at FIG. 11B, a top plan view at FIG. 11C and a bottom view at FIG. 11D.
Figure 11B:
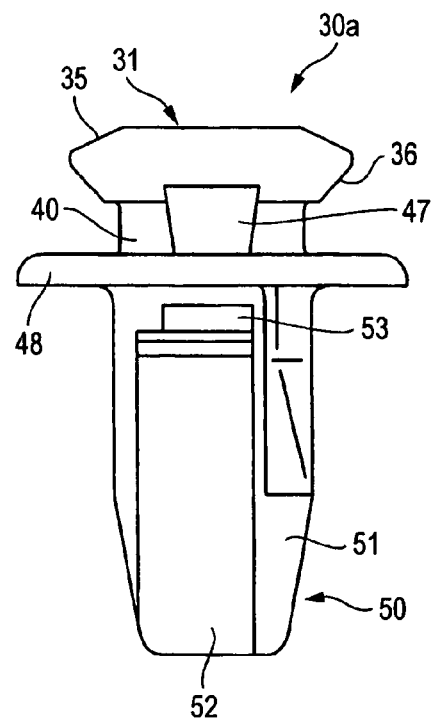
Figure 11C:
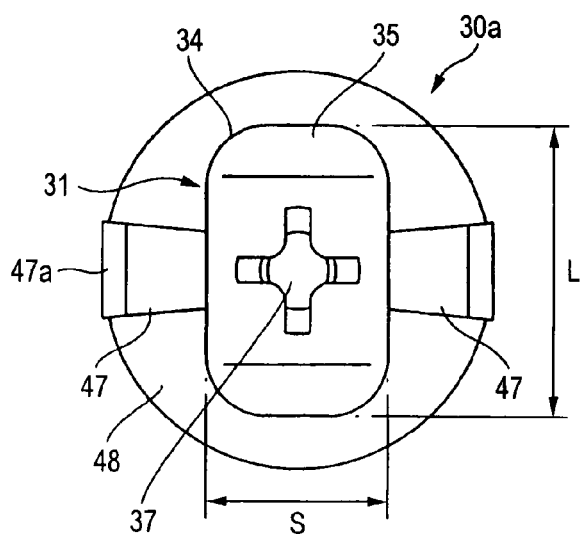
Figure 11D:
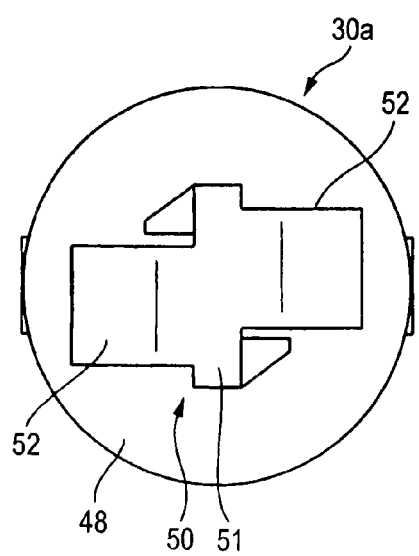
Figure 12A:
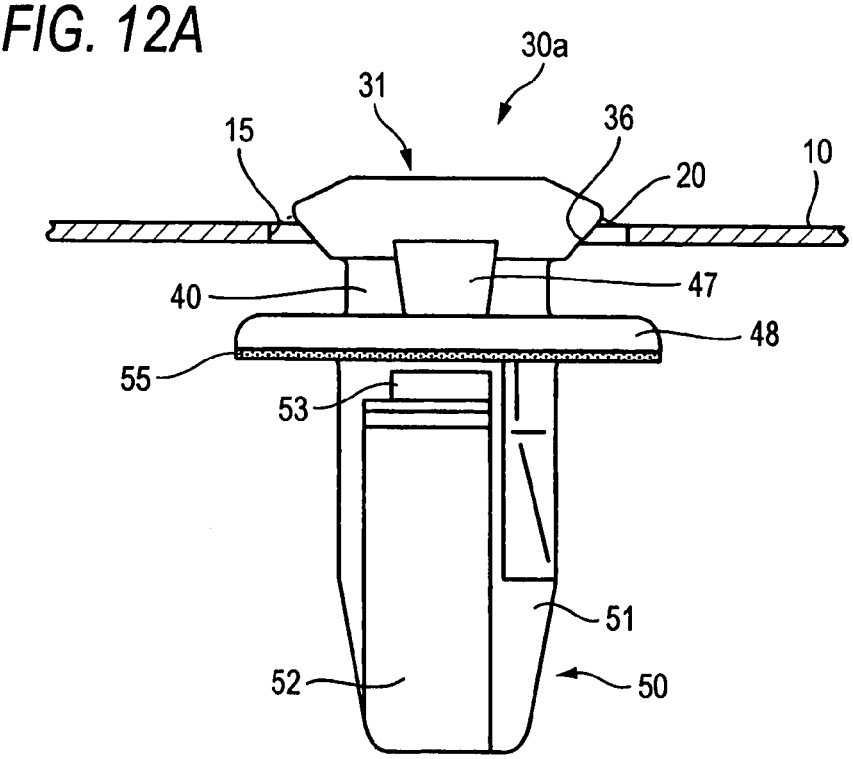
FIGS. 12A and 12B show the state, in which the clip is inserted into a slot of the first part, and presents a front elevation at FIG. 12A and a top plan view at FIG. 12B.
Figure 12B:
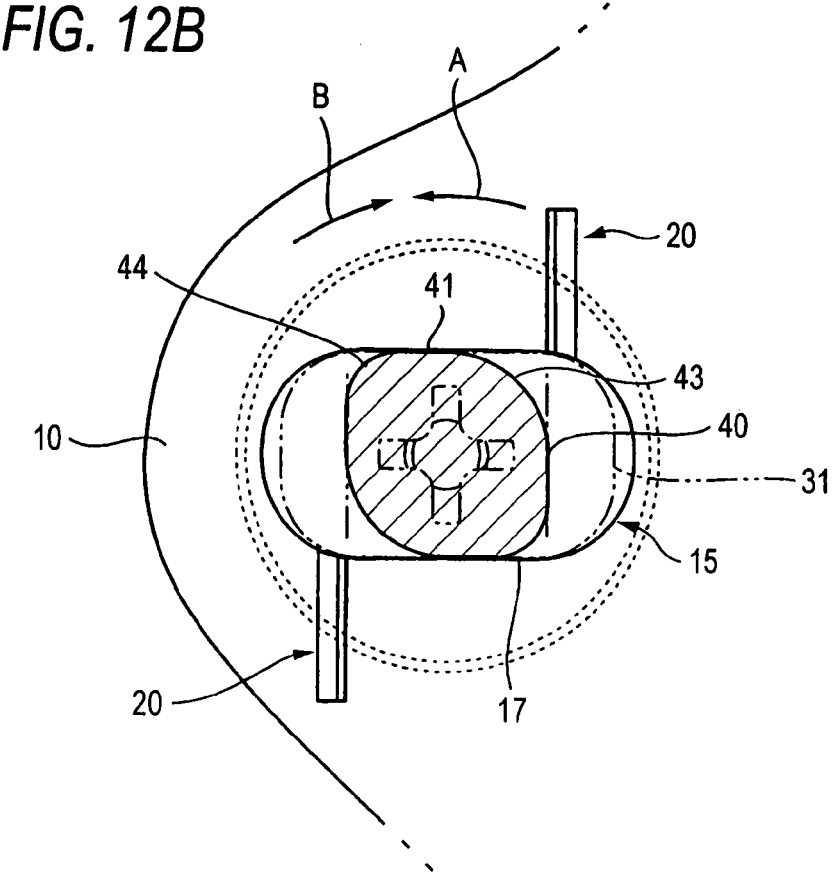

With reference to FIGS. 11B and 11C, moreover, the second flange portion 47 is shaped such that it is narrow at the root end portion connected to the shank portion 40 but becomes gradually wider toward its leading end portion. Moreover, the second flange portion 47 is provided with protrusions 47a, which are enlarged toward the first flange portion 31. As shown in FIGS. 11A and 11B, moreover, the protrusions 47a or the uppermost ends of the second flange portion 47 are extended to become higher than the lower end face of the first flange portion 31 so that they come, when the first flange portion 31 is arranged at a right angle with respect to the slot 15, into elastic abutment against the peripheral edge of the back side of the slot 15. Here, the protrusions 47a enlarge, when the first flange portion 31 of the clip 30a is inserted into the slot 15 and turned, the deflections of the first flange portion 31 thereby to bring the first flange portion 31 into abutment against the back face of the cover member 10 by a stronger force.

Figure 13A:
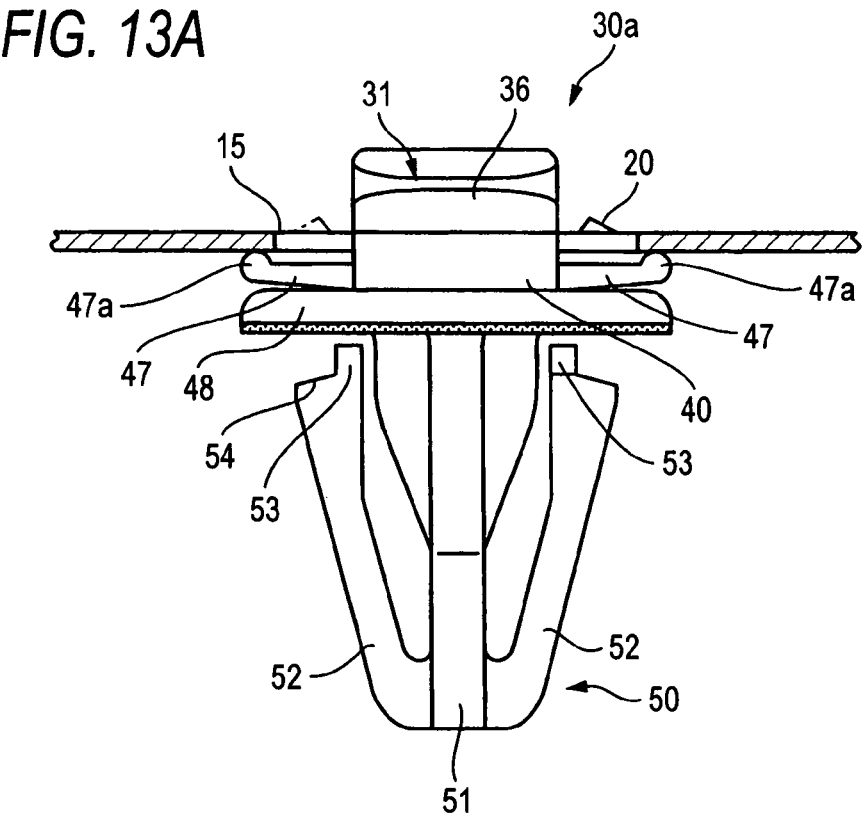
FIGS. 13A and 13B show the state, in which the clip is attached to the first part, and present a front elevation at FIG. 13A and a top plan view at FIG. 13B.
Figure 13B:
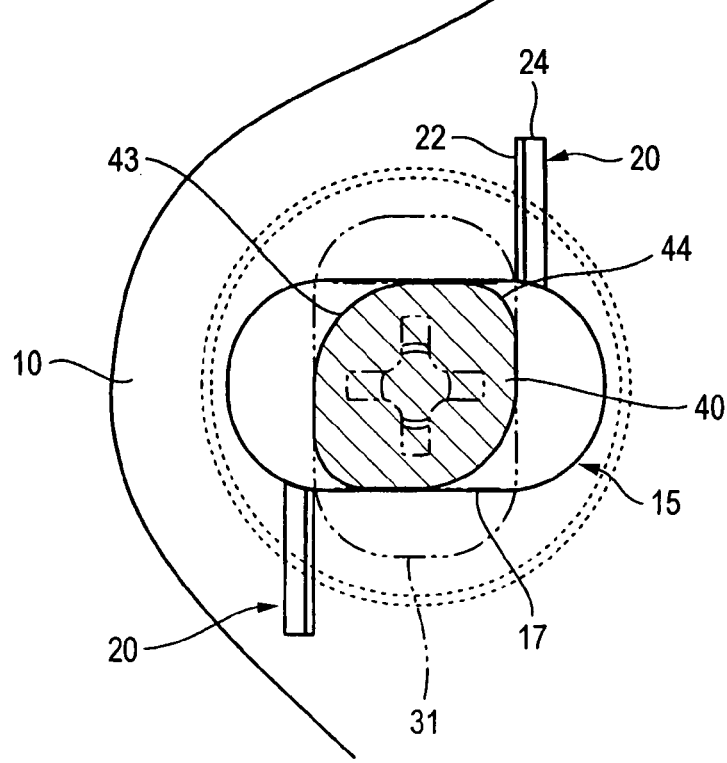

In this mode of embodiment, too, like the foregoing one, the first flange portion 31 of the clip 30a is inserted into the slot 15 of the cover member 10, and the clip 30a is turned in the direction of arrow A. As shown in FIGS. 13A and 13B, the two sides of the first flange portion 31 along the longer diameter direction engage with the individual protrusions 20 thereby to stop the turning motion.

In this mode of embodiment, moreover, the second flange portion 47 is composed of the paired feather members extending in the opposite directions from the outer circumference of the shank portion 40. In case the clip 30a is molded by a die, therefore, a parting face or the like can be easily set to make the mold design relatively simple, so that the manufacturing cost can be suppressed to improve the productivity. Here, the second flange portion 47 in this mode of embodiment is shaped to become gradually wider toward the leading end side. However, the second flange portion 47 may be extended with an equal width from the root end portion to the leading end portion, and may be made so wider in its entirety than the second flange portion 47 shown in FIG. 11C that it forms a sector shape, as seen in the axial direction.

Figure 14:
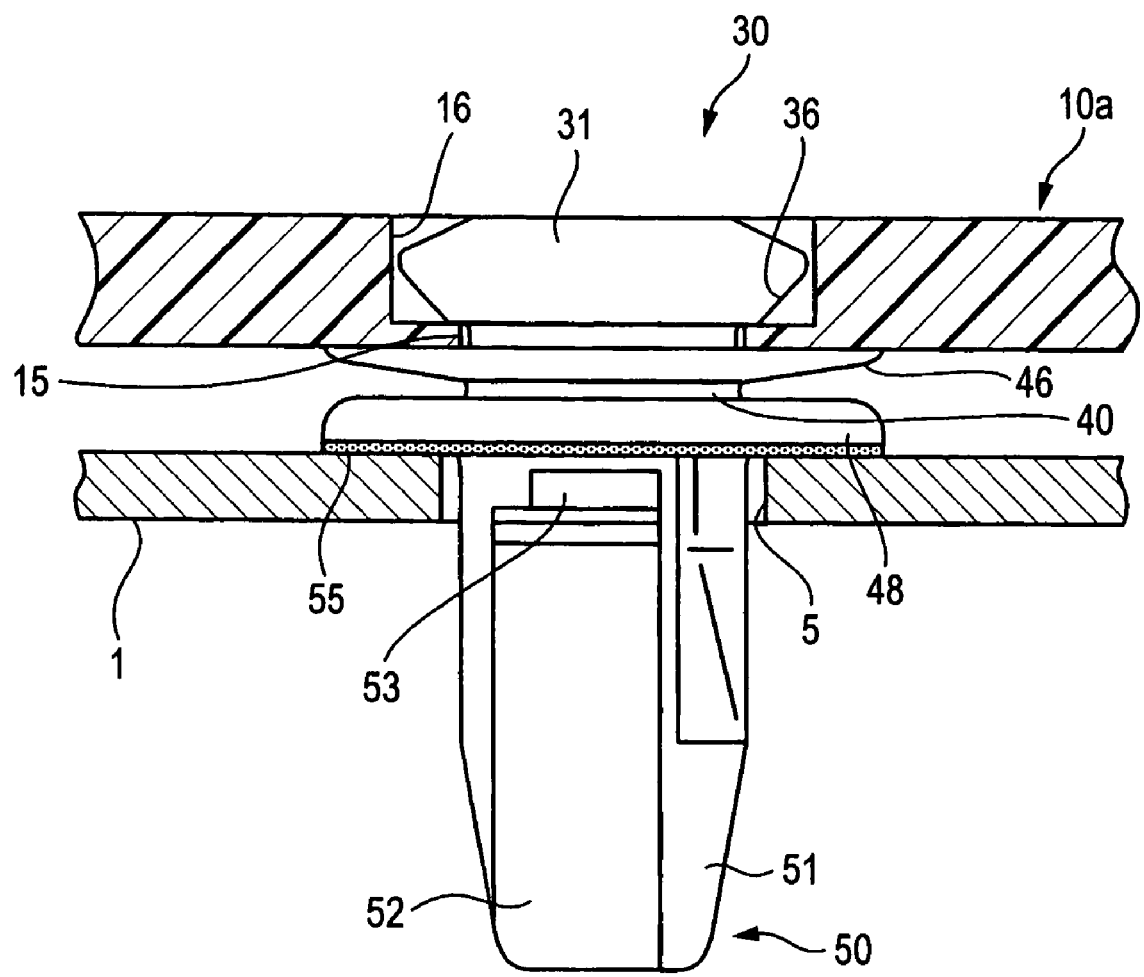
FIG. 14 is an explanatory view showing still another mode of embodiment of the parts attaching structure of the invention.

FIG. 14 shows still another embodiment of the parts attaching structure according to the invention. Here, the portions substantially identical to those of the foregoing mode of embodiment are omitted in their description by designating them by the common reference numerals.

In the case of this mode of embodiment, the material of the cover member is different from that of the foregoing two modes of embodiments. Specifically, the cover member 10 of the foregoing two modes of embodiments is made of a metallic sheet material, but a cover member 10a of this mode of embodiment is made of a synthetic resin. In the peripheral edge of the slot 15 in the upper face of the cover member 10a, moreover, there is formed a groove 16, which is sized to house the first flange portion 31 of the clip 30.

According to this mode of embodiment, when the clip 30 is attached to the cover member 10a, its first flange portion 31 is housed in the groove 16 so that it does not protrude from the cover member 10a. Therefore, the first flange portion 31 of the clip 30 can be protected against an external impact or the like so that it can be prevented from breakage.

What is claimed is:

1. A parts attaching structure, comprising:
a first part having a slot;
a second part having an attaching hole; and
a clip for connecting the first and second parts, the clip including:
a first flange portion having a longer diameter shorter than a length of the slot of the first part and longer than a width of the slot, and a shorter diameter shorter than the width of the slot and adapted to engage with the first part when inserted into and turned in the slot;
a shank portion extending from a central portion of an abutment face of the first flange portion against the first part and inserted into the slot;
a second flange portion bulging from the shank portion, extended obliquely toward the first flange portion, and coming into elastic abutment against a peripheral edge of a back side of the slot;
a third flange portion adjacent to the second flange portion, bulging from the shank portion, and abutting against a peripheral edge of the attaching hole of the second part; and
a leg portion extending from a central portion of an abutment face of the third flange portion against the second part, inserted into the attaching hole of the second part, and retained on a peripheral edge of a back side of the attaching hole,
wherein the shank portion has a section of a generally rectangular shape, as viewed in an axial direction, in which a pair of diagonally positioned corners form sliding portions of arcs of a large curvature, whereas a pair of remaining corners form stopper portions of arcs or corners of a smaller curvature, in which the sliding portions are rotatable in a direction to contact with longer sides of the slot, but in which the stopper portions are unrotatable in a direction to contact with the longer sides of the slot,
wherein the first flange portion is arranged to have its longer diameter direction in a direction of a pair of opposed sides of the shank portion, and
wherein a pair of protrusions, is formed on the first part,
wherein, when the first flange portion and the shank portion are inserted into the slot, the first flange portion is in a first state, where the longer diameter direction of the first flange portion is aligned with the longer sides of the slot,
wherein, when the first flange portion and the shank portion are rotated after being inserted in the slot, the first flange portion is in a second state, where the longer diameter direction of the first flange portion intersects the longer sides of the slot, and
wherein the protrusions are configured:
to be ridden over by a bottom face of the first flange portion when the first flange portion is rotated from the first state toward the second state; and
to abut a side outer face of the first flange portion when the first flange portion is rotated from the second state toward the first state after the first flange portion is ridden over the protrusions, thereby obstructing the first flange portion from returning into the first state.

2. The parts attaching structure according to claim 1, wherein the protrusions are positioned to be closer to the stopper portions as compared with the sliding portions at a time when the first flange portion is in the second state.

3. The parts attaching structure according to claim 1, wherein the second flange portion is shaped to bulge obliquely outward in a skirt shape from an outer circumference of the shank portion toward the first flange portion.

4. The parts attaching structure according to claim 1, wherein the second flange portion includes a pair of feather members bulging obliquely outward from opposed portions of an outer circumference of the shank portion toward the first flange portion.

5. The parts attaching structure according to claim 1, wherein, when the first flange portion is in the first state, the shank portion is rotatable in a first direction where the sliding portions contact respective longer sides of the slot, wherein, when the first flange portion is in the second state after the first flange portion is ridden over the protrusions, the shank portion is rotatable in a second direction opposite to the first direction, and wherein, when the first flange portion is in the second state, the shank portion is strongly regulated from rotating in the first direction only by the stopper portions, and weakly regulated from rotating in the second direction only by the protrusions.

6. The parts attaching structure according to claim 1, wherein in a plan view, said protrusions are visible when the protrusions clamp side portions of the first flange portion.

\* \* \* \* \*